United States Patent [19]
Goldfein

[11] Patent Number: 5,190,357
[45] Date of Patent: Mar. 2, 1993

[54] AIR-ACTUATED BRAKE SYSTEM FOR VEHICLES

[75] Inventor: Nathan Goldfein, Houston, Tex.

[73] Assignee: International Transquip Industries, Inc., Houston, Tex.

[21] Appl. No.: 705,082

[22] Filed: May 24, 1991

[51] Int. Cl.$^5$ .............................................. B60T 13/00
[52] U.S. Cl. ......................................... 303/7; 303/13; 303/28; 303/40
[58] Field of Search ...................... 303/7, 9, 13, 28, 29, 303/30, 84.1, 84.2, 8, 6.01, 9.61, 9.76, 14–18, 63, 89, 86; 188/151 A, 3 R, 3 H

[56] References Cited

U.S. PATENT DOCUMENTS

| | | |
|---|---|---|
| 29,913 | 2/1979 | Case et al. |
| 245,688 | 9/1977 | Clapp |
| 1,176,625 | 3/1916 | Tyson |
| 1,213,363 | 1/1917 | Henry |
| 1,295,020 | 2/1919 | Fallek |
| 1,486,939 | 3/1924 | Winter |
| 2,041,065 | 5/1936 | Hemphill |
| 2,099,453 | 11/1937 | Searle |
| 2,108,182 | 2/1938 | Searle |
| 2,121,366 | 6/1938 | Robinson |
| 2,240,166 | 4/1941 | Stanley |
| 2,579,616 | 12/1951 | Sahlgaard |
| 3,037,819 | 6/1962 | Sulala |
| 3,151,525 | 10/1964 | Dobrikin et al. |
| 3,182,566 | 5/1965 | Burg et al. |
| 3,282,169 | 11/1966 | Leighton |
| 3,294,455 | 12/1966 | Valentine |
| 3,312,314 | 4/1967 | Peters |
| 3,482,666 | 12/1969 | Case et al. |
| 3,497,267 | 2/1970 | Dobrikin |
| 3,507,542 | 4/1970 | Cannella |
| 3,721,474 | 3/1973 | Rogers |
| 3,759,147 | 9/1973 | Johnsson et al. |
| 4,182,535 | 1/1980 | Fannin |
| 4,596,426 | 6/1986 | Clapp |
| 4,685,744 | 8/1987 | Luce |
| 4,763,959 | 8/1988 | Vandemotten ...................... 303/7 X |
| 4,907,842 | 3/1990 | Goldfein |

FOREIGN PATENT DOCUMENTS 1162215  1/1964  Fed. Rep. of Germany.
1204533 11/1965  Fed. Rep. of Germany.

OTHER PUBLICATIONS

Kent's Mechanical Handbook 12th Ed. pp. 13-13 through 13-14.
Bendix RE-6 Relay Emergency Value Datasheet, Cat. No. 03-B-8.
Bendix RE-12 Relay Valve Datasheet, Cat. No. 03-B-4C.
Bendix RV-1 Pressure Valve Datasheet, Cat. No. SD-03-60.
Bendix SV-1 Synchro Valve Datasheet, Cat. No. SD-03-56.
Bendix Pressure Protection Valve Datasheet, Cat. No. SD-03-55.
Bendix DD-3 Datasheet, Cat.No. SD-02-4.
Bendix Inversion Valve Datasheet.
ZD Valve Assembly Datasheet.
Midland N30100 Relay Valve Datasheet.

*Primary Examiner*—Douglas C. Butler
*Attorney, Agent, or Firm*—Vaden, Eickenroht, Thompson, Boulware & Feather

[57] ABSTRACT

The preferred embodiment of the invention is a brake system comprised of a primary source of air under pressure, and independent secondary source of air under pressure, a primary relay, a secondary relay valve, a device for actuating the service brakes, a device for actuating the park brakes and a control device, and a plurality of brake assemblies. The primary relay receives air under pressure only from the primary source and the secondary relay receives air under pressure only from the secondary source, but the other components are so arranges as to achieve complete system redundancy in operation at the source level, the brake level, the hose level, and at the actuation level.

16 Claims, 3 Drawing Sheets

AIR-ACTUATED BRAKE SYSTEM FOR VEHICLES

BACKGROUND OF THE INVENTION

1. Field of the Invention

This invention relates generally to an air-actuated brake system for vehicles and, more particularly, to improvements in such systems of the type which include separate primary and secondary sources of air under pressure that are so connected to brake assemblies as to apply either the service or park brakes even though air is lost from one of the sources.

2. Description of the Prior Art

U.S. Pat. Nos. 4,685,744 and 4,907,842, both assigned to the assignee of this application, show prior brake systems which, as is contemplated by this invention, may be used with various vehicle configurations such as powered vehicles or vehicles consisting of trailers towed by tractors whose compressors charge reservoirs of air on the trailer. Although U.S. Pat. No. 4,685,744 shows a preferred air actuated, mechanically held brake assembly, the present invention contemplates that the brake assembly may alternatively be a so-called spring brake as suggested in U.S. Pat. No. 4,907,842.

The prior system found in U.S. Pat. No. 4,907,842 includes a control means, sometimes called a "multifunction" or "MF" valve, that delivers air received from each of the sources directly to the brake chambers of associated brake assemblies. Thus, although the system was redundant in the sense that the service and park functions were split at the brake level, the loss of a hose leading to the brake chambers resulted in the loss of all parking function unless the operator of the vehicle applied it through the service side. In the case of a spring brake in a system of this type, a lost hose leading to a service brake would result in loss of the service function, and loss of a hose leading to a park brake would cause the brake to be applied automatically.

The object of this invention is to provide a brake system in which these and other problems in similar systems are overcome in that the service and park functions are split and mutually exclusive at all levels to provide redundancy throughout the entire system.

SUMMARY OF THE INVENTION

The preferred embodiment of the invention is a brake system comprised of a primary source of air under pressure, and independent secondary source of air under pressure, a primary relay, a secondary relay, a means for actuating the service brakes, a means for actuating the park brakes, a control means, and a plurality of brake assemblies. The primary relay receives air under pressure only from the primary source and the secondary relay receives air under pressure only from the secondary source, but the other components are so arranged as to achieve complete system redundancy at the source level, the brake level, the hose level, and at the actuation level.

Because of the complete system redundancy, any one relay, source or any hose can be lost without losing either the service or the park brakes. For instance, if the delivery hose is off or the primary relay valve severed, it will only dump primary air and the secondary relay can still apply the parking and service brakes with full air through the secondary circuit. Conversely, if the secondary circuit's delivery hose is broken, then it will only dump secondary air and air from the primary air source will be delivered through the primary relay to apply the parking and service brakes.

BRIEF DESCRIPTION OF THE DRAWINGS

In the drawings, wherein like reference characters are used throughout to designate like parts.

DESCRIPTION OF THE PREFERRED EMBODIMENTS

Figure 1:
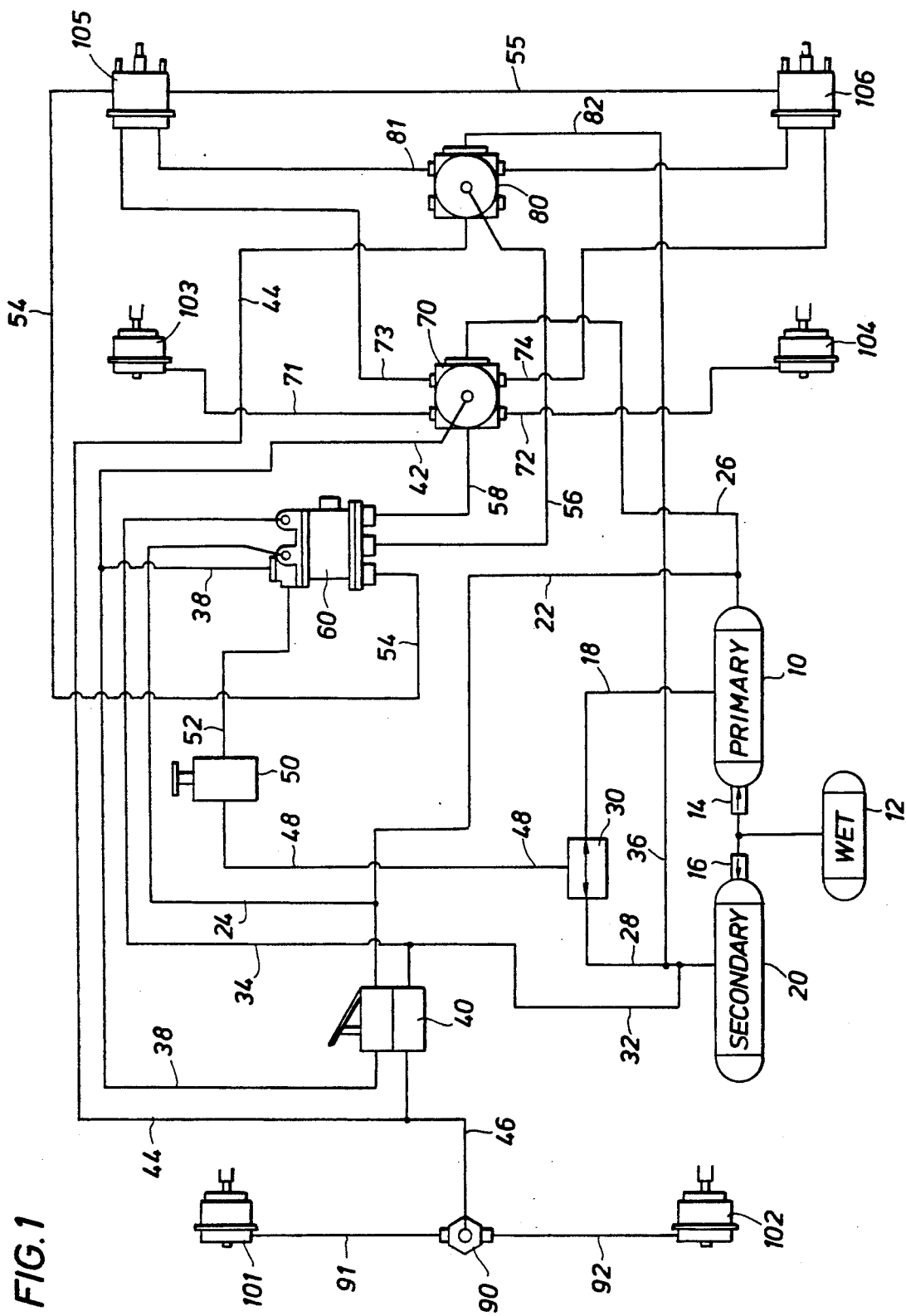
FIG. 1 is a diagrammatic illustration of an air actuated brake system constructed in accordance with the present invention for use in connection with a powered vehicle.

Turning to the drawings, FIG. 1 illustrates a dual source air brake system for a standard powered vehicle or tractor comprising primary source 10, secondary source 20, two-way check valve 30, actuable service signal transmitting means 40, actuable park signal transmitting means 50, control means 60, primary relay 70, and secondary relay 80. The system in its preferred embodiment also includes brake assemblies 101-106, quick release valve 90, and wet tank 12 fed by the compressor (not shown). Quick release valve 90 is commonly known in the art and delivers air under pressure to the brake chambers of brake assemblies 101-102 via lines 91-92.

Brake assemblies 101-104 are conventional air applied brake assemblies as are commonly known to those in the art. Brake assemblies 105-106 in the preferred embodiment are also mechanically held and operate as disclosed and claimed in U.S. Pat. No. 4,658,744. It is to be understood, however, that other brake assemblies for use in both service and park applications may be equally suitable in the place of brake assemblies 105-106.

Each of the brake assemblies 101-106 is mounted to an axle for applying the brakes of the respective assembly. Brake assemblies 101-104 provide brakes only in a service application, while brake assemblies 105-106 have both service and a park applications. Brake assemblies 105-106 receive air under pressure via a two-way check valve whereas brake assemblies 101-104 receive air under pressure directly from either quick release valve 90 or primary relay 70. Each one of brake assemblies 101-106, however, includes a brake pressure chamber having a diaphragm to which a rod is connected for applying the service brakes when air is supplied to the chamber against the diaphragm to move the rod outwardly with respect to the vehicle. Brake assemblies 105-106 include not only a pressure chamber having a diaphragm for applying the service brakes in response to a supply of pressure to the pressure chamber, but also a park brake.

The park brake in brake assemblies 105-106 comprises a piston with teeth on its lower end adapted to engage a rack on the rod to lock the brakes in a park position when the rod has been moved to the applied position. More particularly, the piston is urged downwardly into locking position by a spring, but upwardly in response to air supplied to the lower side of the piston and thereby constitutes a locking means for the brake assembly. Thus, upon venting of the air on the lower side of the piston, the spring urges the piston downwardly to lock the position.

Returning to FIG. 1, primary source 10 supplies air under pressure to two-way check valve 30 via line 18, to service actuator 40 via line 22, to a first supply port of control means 60 via lines 22 and 24, and to the supply port of primary relay 70 via line 26. Secondary source 20 supplies two-way check valve 30 with air under pressure via line 28, to service actuator 40 via line 32, to a second supply port of control means 60 via lines 32 and 34, and to the supply port of secondary relay 80 via line 36. Each of primary source 10 and secondary source 20 are charged by a compressor on the tractor through wet tank 12.

Service actuator 40 is one of several means of conventional construction well known to those in the art and controls the application and release of brakes in the service side of the brake system. It is important to note, however, that such service actuators are known to those in the art to be available in "single" and "dual" configurations and that the practice of the invention requires either a dual configuration or a single configuration whose supply is received from separate isolated sources through a two way check valve and whose output is split into two lines.

Service actuator 40, sometimes known as a treadle valve, is actuable upon receipt of air from either one, or both, of primary air or secondary air to generate a signal indicating that service brakes either be applied or released that is transmitted to a first signal port of control means 60 via line 38, to the control port of primary relay 70 via lines 38 and 42, to the balance port of secondary relay 80 via line 44, and to quick release valve 90 via line 46.

Service actuator 40 operates in a manner well known to those in the art in that depressing the dual treadle allows two valves (not shown) contained therein to open, thereby allowing air under pressure to pass from lines 22 and 32 into lines 38, 44, and 46 transmitting a primary and a secondary signal, respectively, to control means 60, a primary and a secondary signal to primary relay 70 and secondary relay 80, respectively, and a secondary signal to quick release valve 90 indicating that the service brakes are to be applied. The primary signal is transmitted with primary air and indicates that the service brakes are to be applied with primary air. Similarly, the secondary signal is transmitted with secondary air and indicates that the service brakes are to be applied with secondary air.

Releasing the dual treadle closes the internal valves of service actuator 40 thereby closing lines 32 and 22 and exhausting lines 38, 44 and 46. Exhausting lines 38, 44 and 46 results in loss of signal to each of control means 60, primary relay 70, secondary relay 80 and quick release valve 90. Air under pressure in line 22 does not mingle with that of line 32 in service actuator 40 such that the primary side and the secondary side remain isolated and that line 38 contains primary air and lines 44 and 46 contain secondary air when under pressure.

Park actuator 50 receives air under pressure from two-way check valve 30 via line 48 and transmits a signal to a second signal port of control means 60 via line 52 indicating whether the park brakes are to be applied or released. Two-way check valve 30 receives air under pressure from both primary source 10 and secondary source 20 and operates in a manner well known in the art to allow air from either line 18 or line 28 into line 48 such that the air under pressure in line 48 may originate from either primary source 10 or secondary source 20 while isolating the primary side of the system from the secondary side.

Park actuator 50 is typically a push-pull valve having an exhaust port and is actuable upon receipt of either one, or both, of primary air or secondary air. The supply port of park actuator 50 is opened thereby delivering air under pressure from line 48 to line 52 via the delivery port of park actuator 50 until such time as park actuator 50 is actuated. When park actuator 50 is actuated, its supply port is closed and line 52 is exhausted via the delivery and exhaust ports of park actuator 50, thereby transmitting a park signal to control means 60 indicating that the park brakes are to be applied. The exhaust port of park actuator 50 is closed and the supply port opened when park actuator 50 is deactuated thereby restoring air under pressure in line 52 and resulting in loss of signal to the second signal port of control means 60.

Control means 60 in the preferred embodiment is a multi-function inversion valve as is disclosed in U.S. Pat. No. 4,907,842 so as to receive air at a first supply port from primary source 10 via lines 22 and 24, and from secondary source 20 via lines 32 and 34 at its second supply port. Similarly, control means 60 receives the service signal generated by service actuator 40 at its first signal port via line 38 and the park signal generated by park actuator 50 at its second signal port via line 52. Control means 60 also delivers air under pressure to the locking means of brake assemblies 105-106 via line 54-55, to the control port of secondary relay 80 via line 56, and to the balance port of primary relay 70 via line 58 in response to the signals received from lines 52 and 38.

Primary relay 70 receives air under pressure through its supply port from primary source 10 via line 26 and delivers air under pressure through its delivery ports to the pressure chambers of brake assemblies 103-106 upon receipt of a service signal at either its balance or control port via line 42 or 58. Secondary relay 80 operates analogously in that it receives air under pressure through its supply port from secondary source 20 via line 36 and delivers air under pressure to the brake chambers of brake assemblies 105-106 upon receipt of a service signal at its balance or control port via line 44 or 56. Primary relay 70 and secondary relay 80 in the preferred embodiment is an R14 relay valve manufactured by the Heavy Vehicle System Group of Bendix, Inc. Although valves of other manufacturers may be equally acceptable. These Bendix valves are configured such that they have four delivery ports and, since secondary relay 80 only services two brake assemblies, two of its delivery ports must be plugged as is well known in the art. Primary relay 70 delivers air under pressure to the pressure chambers of assemblies 103-106 via lines 71-74 and secondary relay 80 delivers air under pressure to the brake Chambers Of assemblies 105-106 via lines 81-82.

The operation of the brake system shown in FIG. 1 may be separately described in its service brake application and in its park brake applications. Application of service brakes involves supplying air under pressure to the pressure chambers of brake assemblies 101-106 via their associated lines and application of the park brakes necessitates exhausting air under pressure in lines 54 and 55 subsequent to delivery of air under pressure to the pressure chambers of brake assemblies 105–106.

Service brake application typically occurs when the brakes of all brake assemblies 101–106 are in a released state and, as such, lines 71–74, 81–82, and 91–92 have all been exhausted and contain only negligible amounts of air under pressure. Service brake application begins by depressing the treadle of service actuator 40 to allow air under pressure in lines 22 and 32 to enter lines 38 and 44 thereby generating and transmitting a signal to the first signal port of control means 60, the control port of primary relay 70, and the balance port of secondary relay 80. Receipt of the service signal by control means 60 prevent application of the park brakes (i.e., the locking means of brake assemblies 105–106) as is discussed below. Upon receipt of the service signal at their control and balance ports, respectively, primary relay 70 and secondary relay 80 deliver air under pressure from their respective supply to the brake chambers of their respective brake assemblies. Quick release valve 90 similarly delivers air under pressure to brake assemblies 101–102 via lines 91–92 upon receipt of the service signal via line 46.

Release of the treadle of service actuator 40 results in loss of service signal whereupon primary relay 70 and secondary relay 80 shut off delivery of air under pressure from supply and primary relay 70 exhausts the pressure from lines 71–74 and secondary relay 80 vents pressure from lines 81–82. Similarly, quick release valve 90 vents pressure from lines 91–92. Exhausting lines 71–74, 81–82, and 91–92 exhausts the pressure from the brake chambers of brake assemblies 101–106 and thereby releases the brakes of those assemblies.

In this system, even if the secondary source or the complete secondary system is inoperable, a service signal can still be sent from the primary source through the primary side of the service actuator to the primary service relay valve, which in turn sends a delivery signal to the brake chamber, thereby applying the service brakes because of the system separation. Conversely, if the primary source is lost, a secondary service signal can be sent through the secondary half of the service actuator to the secondary service relay valve which sends a service signal to the brake chamber. Thus, even if sources are the delivery hose from the service relay was lost, it would still be possible to apply the service brakes automatically through the secondary relay.

Park brake application also typically occurs when the brakes of each of brake assemblies 101–106 are released, and as such, lines 71–74, 81–82, and 91–92 are exhausted while lines 52 and 54–55 are under pressure. When park actuator 50 is actuated, it shuts off air under pressure from supply and exhausts pressure in line 52 through its exhaust port, thereby signaling control valve 60 to apply the park brakes of assemblies 105–106. At the same time, the treadle of service actuator 40 must be in a released state since pressure on either one of line 38 or line 52 will prevent application of the park brakes. Control means 60 then delivers air under pressure from supply to primary relay 70 and secondary relay 80 to apply air to the pressure chamber of brake assemblies 103–106. Once the service brakes are applied, control means 60 exhausts lines 54–55 thereby activating the means for locking in assemblies 105–106 to complete the park brake application.

When park actuator 50 is deactuated, air under pressure from supply is delivered to the second signal port of control means 60 thereby restoring pressure to line 52. Pressure is then restored to line 54–55 to release the means for locking in assemblies 105–106 and lines 56 and 58 are then exhausted, causing loss of service signal to primary relay 70 and secondary relay 80 to exhaust the pressure in the brake chambers of 105–106 thereby releasing the service brakes and completing the release of the park brakes.

Figure 4:
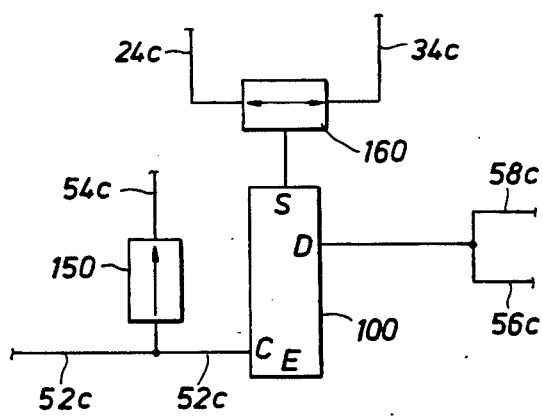
FIG. 4 is a diagrammatic view of a modified control means for use with any one of the foregoing systems.

The brake system of FIG. 1 can be implemented with other inversion-type control valves, such as the TR-3 manufactured also by Bendix, Inc. but with some minor changes in plumbing as shown in FIG. 4. For instance, TR-3 valve 100 of FIG. 4 is well known in the art to have control, supply, and delivery ports, but does not operate in the same way as the multi-function valve. TR-3 valve 100 will nevertheless function in a similar manner if air under pressure from park actuator 50 (not shown) is transmitted both directly to the control port of TR-3 valve 100 via line 52c and to line 54c through bypass one-way check valve 150. Bypass check valve 150 may be one of a number known to those in the art that freely allow flow in one direction and allow air to bleed in the opposite direction. Bypass check valve 150 in the preferred embodiment is a bypass valve No. 110183 manufactured by Sealco Air Products.

Supply air in lines 24c and 34c must also be fed to two-way check valve 160 and the delivery from two-way check valve 160 to the supply port of TR-3 valve 100. The delivery port of TR-3 valve 100 must deliver pressure directly to the balance port of primary relay 70 via line 58c and the control port of secondary relay 80 via line 56c. A TR-3 inversion valve plumbed in this manner in the brake system of FIG. 1 or FIG. 2 will function similarly to the ITI multi-function valve described above, but in a less preferred way in that it will not sequence actuation of the service brakes and application of the locking means and does not provide many of the safety and locking features of U.S. Pat. No. 4,907,842.

In summary, the brake system of FIG. 1 attains first level of redundancy by totally separating the air under pressure delivered to the brake assemblies, i.e., the air under pressure received by primary relay 70 and delivered to brake assemblies 103–106 is isolated from the air under pressure received and delivered by secondary relay 80 and quick release valve 90. Redundancy could also be achieved by delivering air under pressure to the first signal port of control means 60 from a two-way check valve similar to two-way check valve 30 instead of line 38 wherein the new two-way check valve is supplied by air under pressure from lines 38 and 44.

Redundancy is also attained in the park brake application of the brake system, although in a different manner. Air under pressure in line 48 may be obtained from any one of the two separate isolated sources of air pressure in the system, those being primary source 10 and secondary source 20. The park signal is transmitted directly and solely to control means 60 in contrast to the service side of the system wherein the service signal is transmitted in parallel and to multiple destinations. However, since exhaust of pressure in line 52 constitutes transmission of the park signal, a rupture in line 52 will be perceived as a signal to apply park brakes thereby achieving redundancy through a fail-safe mechanism.

Figure 2:
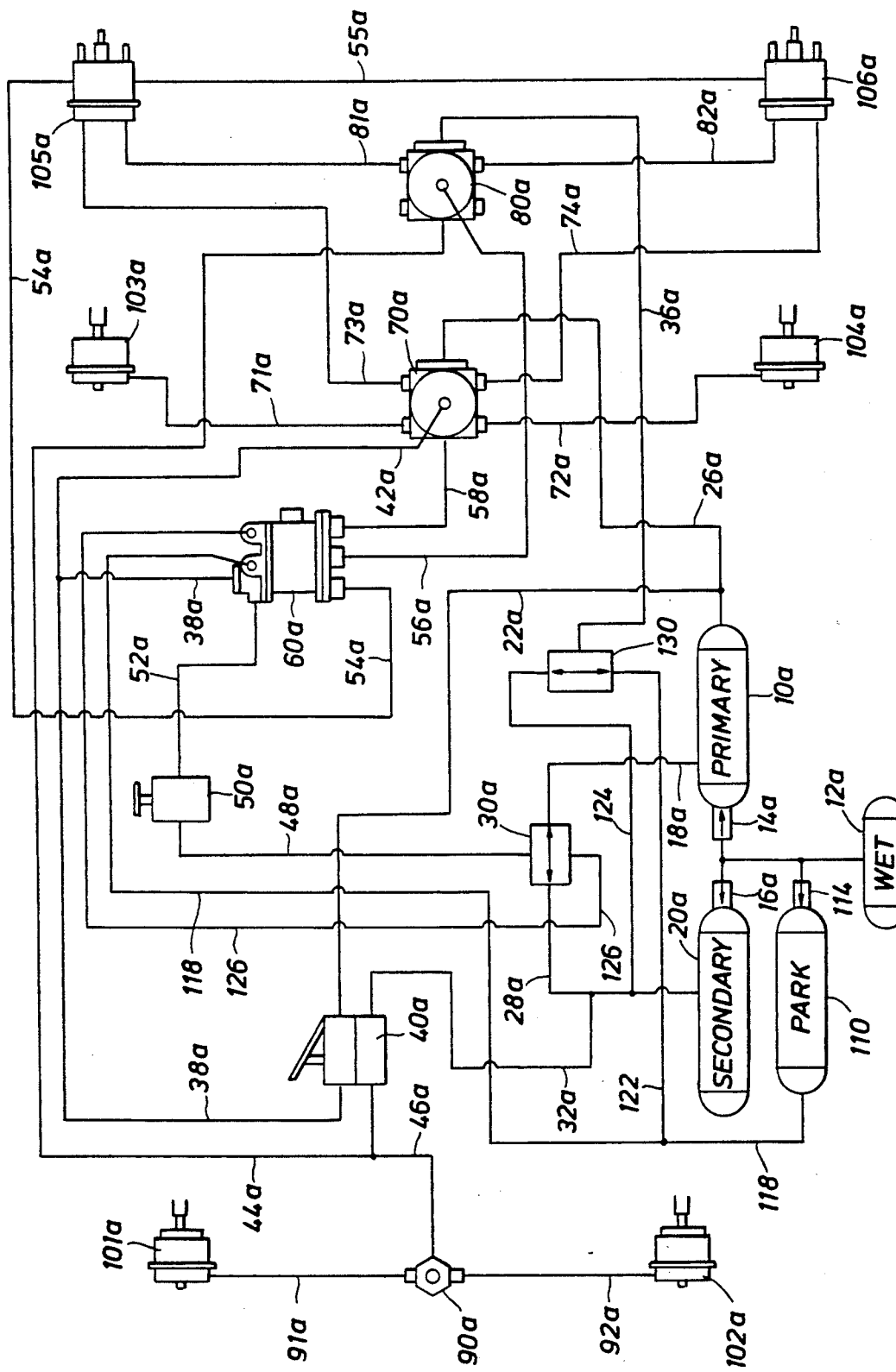
FIG. 2 is a view of another air actuated brake system constructed in accordance with the present invention and is similar to the system of FIG. 1 except that it further includes a third source of air under pressure dedicated for use with the park brake of the system.

FIG. 2 illustrates a modified embodiment of the system in FIG. 1 in which the power vehicle or tractor also has a dedicated park source. Many of the components of the brake system illustrated in FIG. 2 perform the same function as like components in FIG. 1 with like components having like numbers. Park source 110 is supplied with air under pressure from the compressor (not shown) through wet tank 12a and check valve 114 as are primary source 10a and secondary source 20a through one-way check valves 14a and 16a. Two-way check valve 130 is supplied with air under pressure from park source 110 via line 122 and from secondary source 20a via line 124 and supplies air under pressure from either one of park source 110 or secondary source 120a to the supply port of secondary relay 80a via line 36a.

Thus, the additional of park source 110 provides an additional level of redundancy to service brake application since the service side and the park side of the brake system are now supplied with air under pressure from three independent and isolated sources as opposed to two separate sources found in the brake system of FIG. 1. Further, control means 60a is supplied with air under pressure at its first supply port from park source 110 via line 118 and at its second supply port with air under pressure from either one of primary source 10a or secondary source 20a via two-way check valve 30a and line 126. Control means 60a in the embodiment of FIG. 2 may therefor be supplied with air under pressure from any two of three independent isolated sources for the purpose of applying the park brakes.

Figure 3:
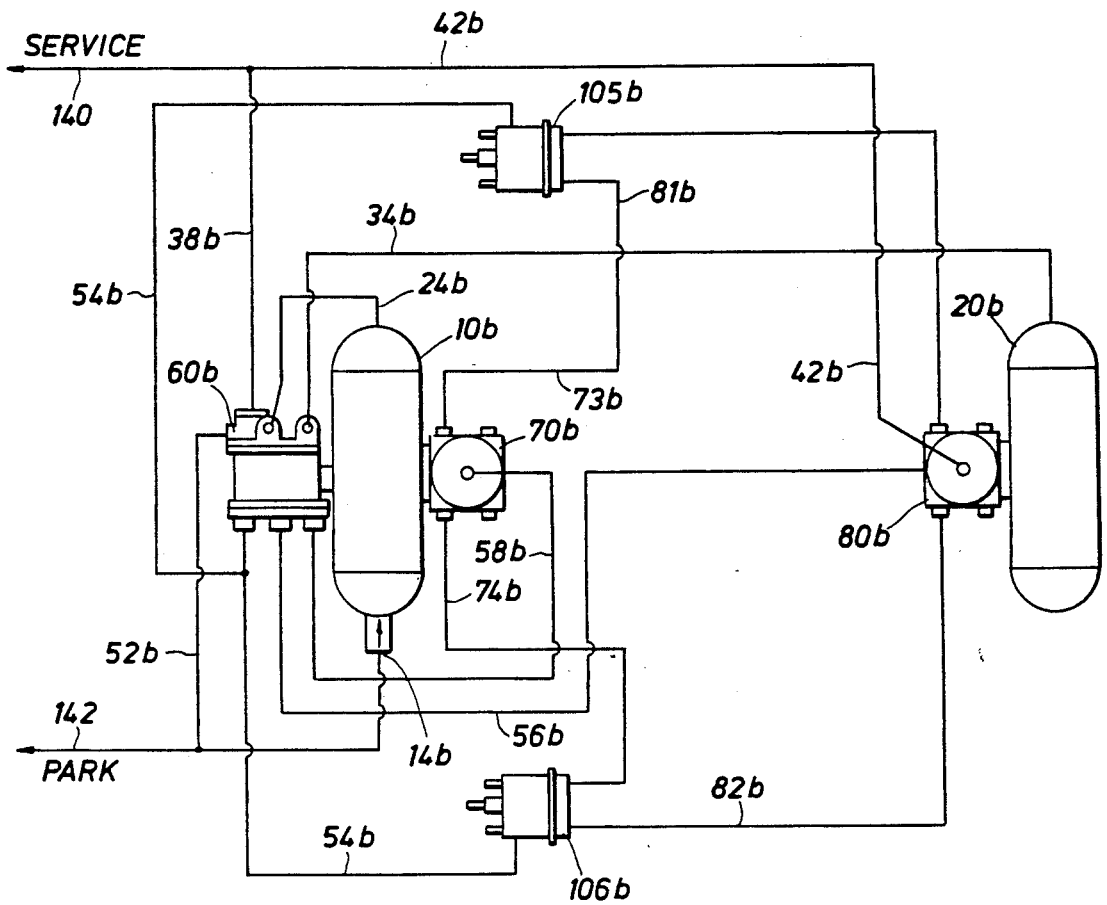
FIG. 3 is a view of a further air actuated brake system constructed in accordance with the present invention for use in a trailer adapted to be towed by a tractor.

FIG. 3 illustrates how the invention may be adapted for application with single axle trailer wherein components performing analogous functions to those found in FIGS. 1 and 2 are designated with like numbers. The primary difference in the system depicted in FIG. 3 and the systems depicted in FIGS. 1-2 results from differences between tractors and trailers as will be appreciated by those or ordinary skill in the art. However, embodiments for trailers are only used where the trailer is connected to a system such as shown in FIGS. 1 or 2 so that the park and service signals are generated in the tractor externally to the trailer and transmitted to the trailer also in a manner known to those of ordinary skill in the art. Thus, each system for a trailer such as that shown in FIG. 3 will employ a service actuator and a park actuator by Virtue of its connection to an associated tractor and in the same manner as embodiments for tractors.

Primary source 10b and secondary source 20b of FIG. 3 are supplied with air under pressure from the tractor via line 142 and check valve 14b through the implementation of sequential filling techniques as are known in the art as demonstrated by U.S. Pat. No. 4,182,535 and U.S. Pat. No. 4,907,842. Primary relay 80b and secondary relay 70b are also supplied directly from primary source 20b and secondary source 10b, respectively, rather than through associated lines as found in FIGS. 1-2. One-way check valve 14b and line 142 can alternatively be used to fill source 20b first, rather than 10b, although it would require slight changes in the sequential filling process that would be apparent to those of ordinary skill in the art. Otherwise, supply and exhaust of air under pressure and response to signal is as described above.

As noted throughout, the embodiments disclosed in the Figures and in the specification above are only preferred embodiments. The invention contemplates that there are other, equally effective embodiments although they may be less preferred. For instance, the embodiment shown in FIG. 1 could easily be implemented on a two-axle tractor such that brake assemblies 103-104 and lines 71-72 would be eliminated by making minor changes readily apparent to those of ordinary skill in the art. The preferred embodiments disclosed above are therefore not to be considered as limiting the scope of the invention as claimed below.

What is claimed is:

1. An air actuated brake system for a vehicle, comprising:
   a brake assembly for at least one axle thereof including a service brake which is applied upon delivery of air thereto and a park brake which is applied upon the venting of air therefrom,
   a primary source of air under pressure,
   a secondary source of air under pressure separate from the first source,
   a primary relay for receiving air from said primary source and delivering it to the service brake in response to at least one of a service signal and a parking brake,
   a secondary relay for receiving air from said secondary source and delivering it to the service brake in response to at least one of a service signal and a parking signal,
   control means adapted for receiving air from at least one of said primary and secondary sources and adapted, in response to a park signal to vent air from the park brake and to transmit a service signal to primary and secondary relays, respectively,
   means actuable, upon the receipt of air from at least one of said primary and secondary sources, to transmit a service signal to said primary and secondary relays, respectively, and to said control means,
   means actuable, upon the receipt of air from at least one of said primary and secondary sources, to transmit a park signal to the control means, and
   means for preventing loss of air delivered to the service brake or the control means in the event of loss of air from either source.

2. A brake system as in claim 1, wherein:
   the axle is on a powered vehicle, and
   each of said sources is charged from a compressor on the vehicle.

3. A brake system as in claim 1, wherein:
   the axle is on a trailer pulled by a tractor,
   the signal transmitting means are on the tractor, and
   the air sources are charged from a compressor on the tractor.

4. A brake system as in claim 1, wherein:
   said secondary source of air under pressure includes first and second sources that are separate from one another,
   said service signal transmitting means receives air from the first source,
   said control means receives air from the second source, and
   said secondary relay receives air from at least one of the first and second sources.

5. An air actuated brake system for a vehicle, comprising:
   a brake assembly for at least one axle thereof including a service brake which is applied upon delivery of air thereto,
   a primary source of air under pressure,
   a secondary source of air under pressure separate from the first source,
   a primary relay receiving air from said primary source and delivering air to the service brake in response to a service signal, a secondary relay receiving air from said secondary source and delivering air to the service brake in response to a service signal, means actuable, upon the receipt of air from at least one of said primary and secondary sources, to transmit a service signal to said primary and secondary relays, respectively, and means for preventing loss of air delivered to the service brake in the event of loss of air from said primary and secondary sources.

6. A brake system as in claim 5, wherein:
the axle is on a powered vehicle, and
each of said primary and secondary sources is charged from a compressor on the vehicle.

7. A brake system as in claim 5, wherein:
the axle is on a trailer pulled by a tractor,
the signal transmitting means is on the tractor, and
said primary and secondary sources are charged from a compressor on the tractor.

8. A brake system as in claim 5, wherein:
said secondary source of air under pressure includes first and second sources which are separate from one another,
said service signal transmitting means receives air from the first source, and
said secondary relay receives air from at least one of the first and second sources.

9. An air actuated brake system for a vehicle, comprising:
a brake assembly for at least one axle thereof including a service brake which is applied upon delivery of air thereto and a park brake which is applied upon the venting of air therefrom,
a primary source of air under pressure,
a secondary source of air under pressure separate from the first source,
a primary relay for receiving air from said primary source and delivering it to the service brake in response to at least one of a service signal and a parking brake,
a secondary relay for receiving air from said secondary source and delivering it to the service brake in response to at least one of a service signal and a parking signal,
control means adapted for receiving air from at least one of said primary and secondary sources and adapted, in response to a park signal to vent air from the park brake and to transmit a service signal to primary and secondary relays, respectively,
means actuable, upon the receipt of air under pressure, to transmit a service signal to said primary and secondary relays, respectively, and to said control means,
means actuable, upon the receipt of air under pressure, to transmit a park signal to the control means, and means for preventing loss of air delivered to the service brake or the control means in the event of loss of air from either source.

10. A brake system as in claim 9, wherein:
the axle is on a powered vehicle, and
each of said sources is charged from a compressor on the vehicle.

11. A brake system as in claim 9, wherein:
the axle is on a trailer pulled by a tractor,
the signal transmitting means is on the tractor, and
the air sources are charged from a compressor on the tractor.

12. A brake system as in claim 9, wherein:
said secondary source of air under pressure includes first and second sources that are separate from one another,
said service signal transmitting means receives air from the first source,
said control means receives air from the second source, and
said secondary relay receives air from at least one of the first and second sources.

13. An air actuated brake system for a vehicle, comprising:
a brake assembly for at least one axle thereof including a service brake which is applied upon delivery of air thereto,
a primary source of air under pressure,
a secondary source of air under pressure separate from the first source,
a primary relay receiving air from said primary source and delivering air to the service brake in response to a service signal,
a secondary relay receiving air from said secondary source and delivering air to the service brake in response to a service signal,
means actuable, upon the receipt of air under pressure, to transmit a service signal to said primary and secondary relays, respectively, and
means for preventing loss of air delivered to the service brake in the event of loss of air from said primary and secondary sources.

14. A brake system as in claim 13, wherein:
the axle is on a powered vehicle, and
each of said primary and secondary sources is charged from a compressor on the vehicle.

15. A brake system as in claim 13, wherein:
the axle is on a trailer pulled by a tractor,
the signal transmitting means is on the tractor, and
said primary and secondary sources are charged from a compressor on the tractor.

16. A brake system as in claim 13, wherein:
said secondary source of air under pressure includes first and second sources which are separate from one another,
said service signal transmitting means receives air from the first source, and
said secondary relay receives air from at least one of the first and second sources.

* * * * *